J. REICHMANN.
FLUID PRESSURE BRAKE APPARATUS.
APPLICATION FILED OCT. 9, 1909. RENEWED NOV. 19, 1910.
991,801.
Patented May 9, 1911.
8 SHEETS—SHEET 1.
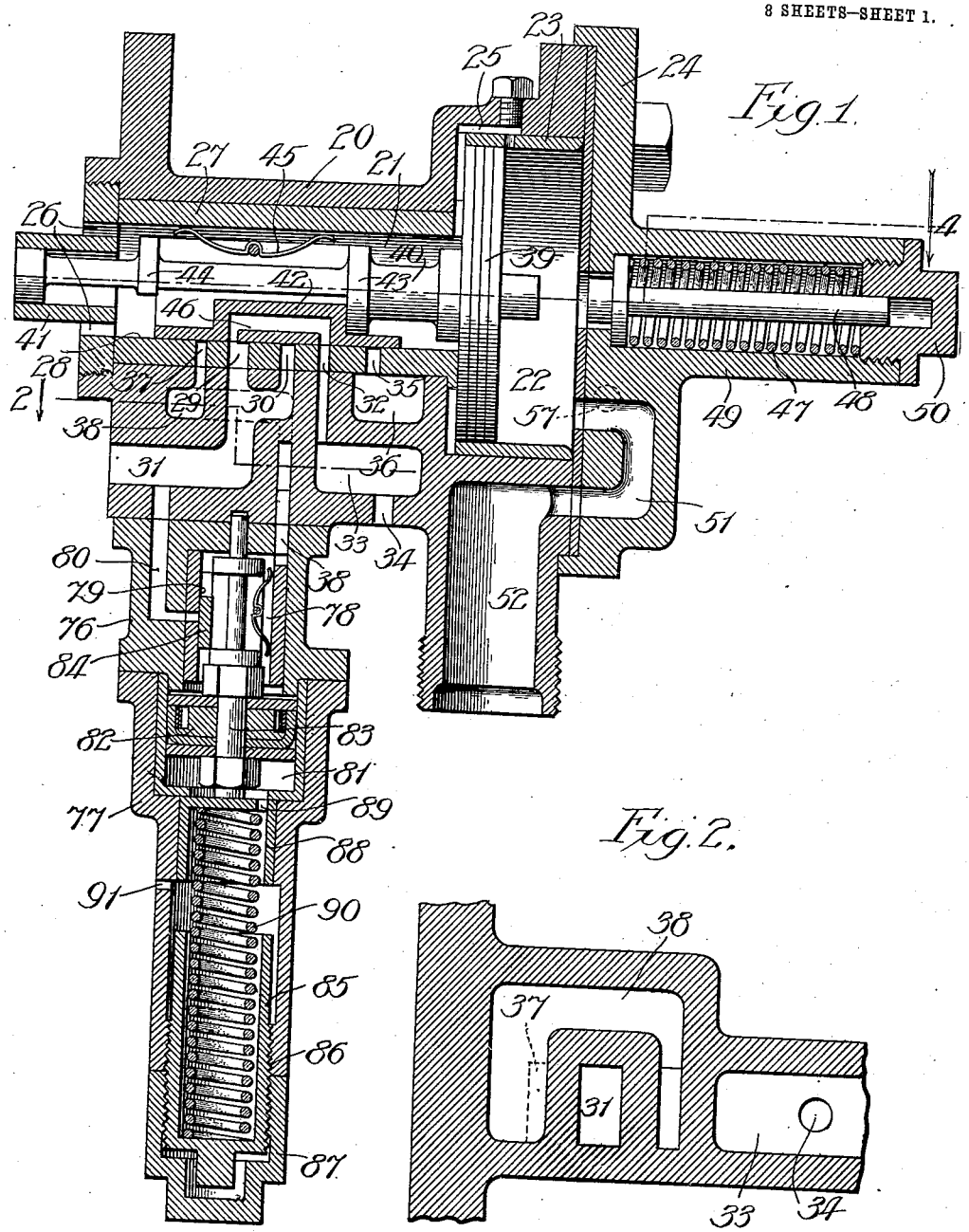
Witnesses:
John Enders
Chas. H. Buell
Inventor:
Joseph Reichmann.
By Dyrenforth, Lee, Chritton & Wiles,
Attys.

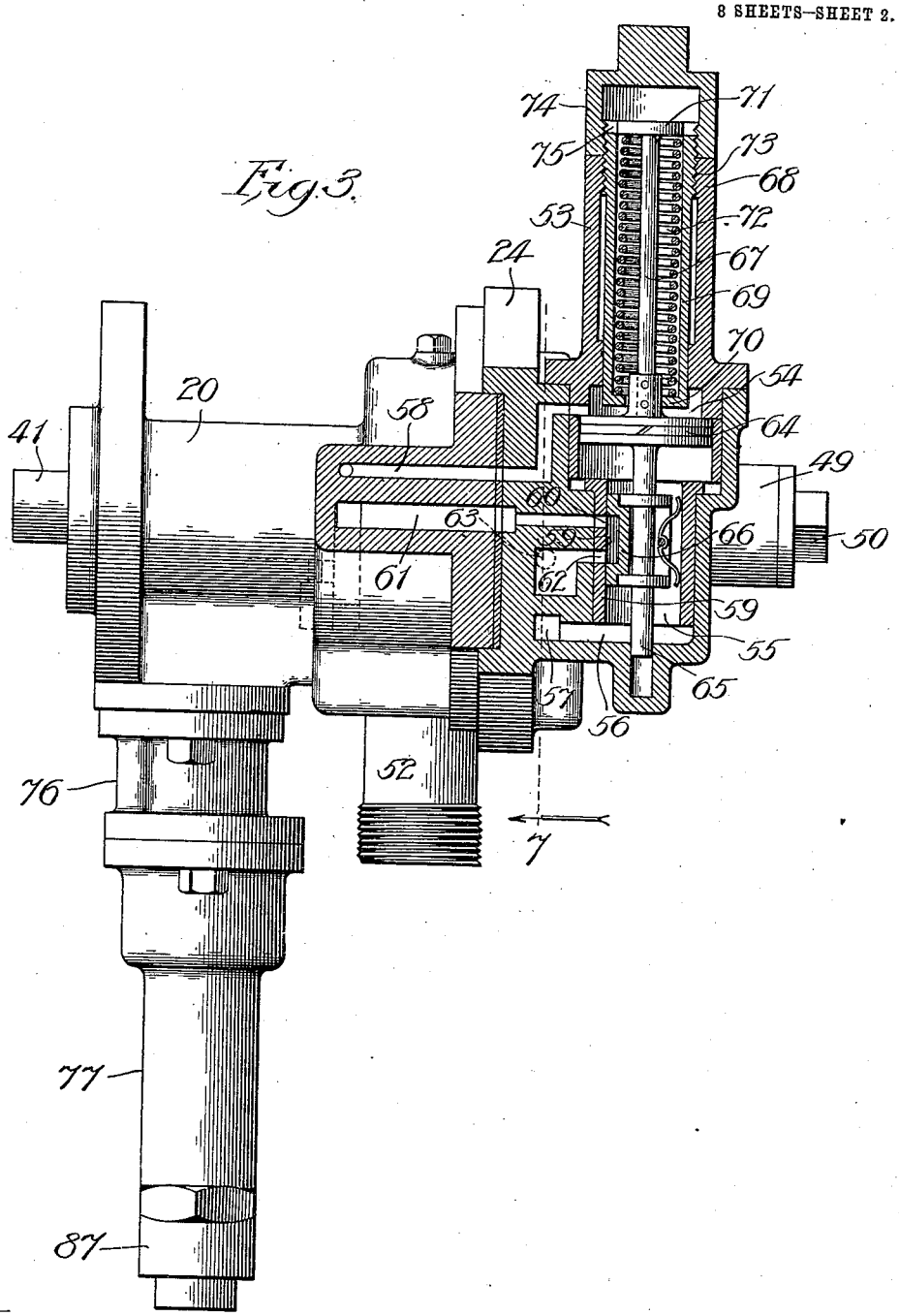

J. REICHMANN.
FLUID PRESSURE BRAKE APPARATUS.
APPLICATION FILED OCT. 9, 1909. RENEWED NOV. 19, 1910.
991,801.
Patented May 9, 1911.
8 SHEETS—SHEET 3.
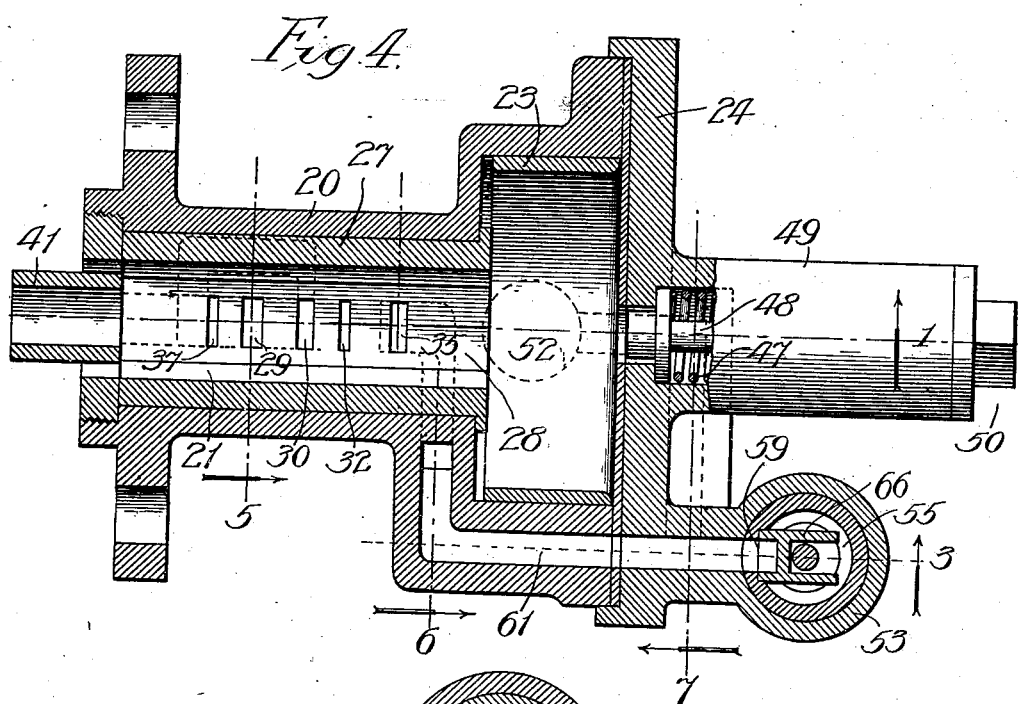
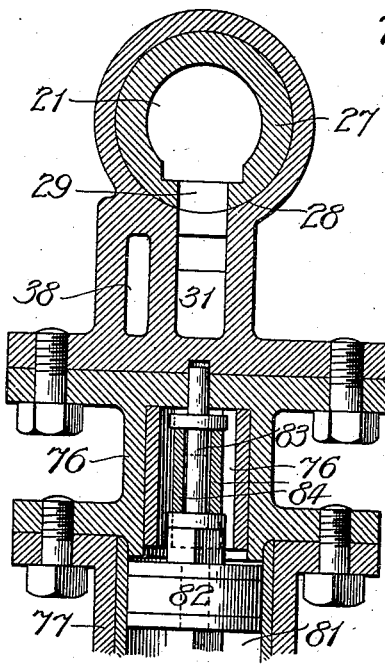

J. REICHMANN.
FLUID PRESSURE BRAKE APPARATUS.
APPLICATION FILED OCT. 9, 1909. RENEWED NOV. 19, 1910.

991,801.

Patented May 9, 1911.

8 SHEETS—SHEET 4.

Witnesses:
John Enders
Chas. H. Bull

Inventor:
Joseph Reichmann
By Dyrenforth, Lee, Chritton & Wiles,
Attys.

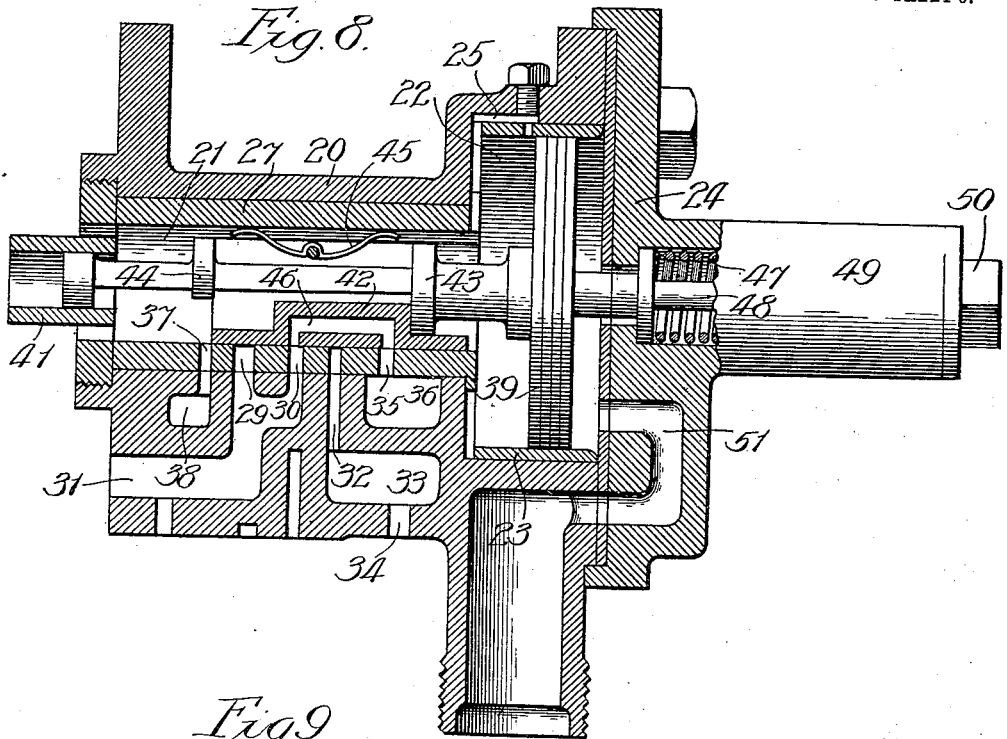
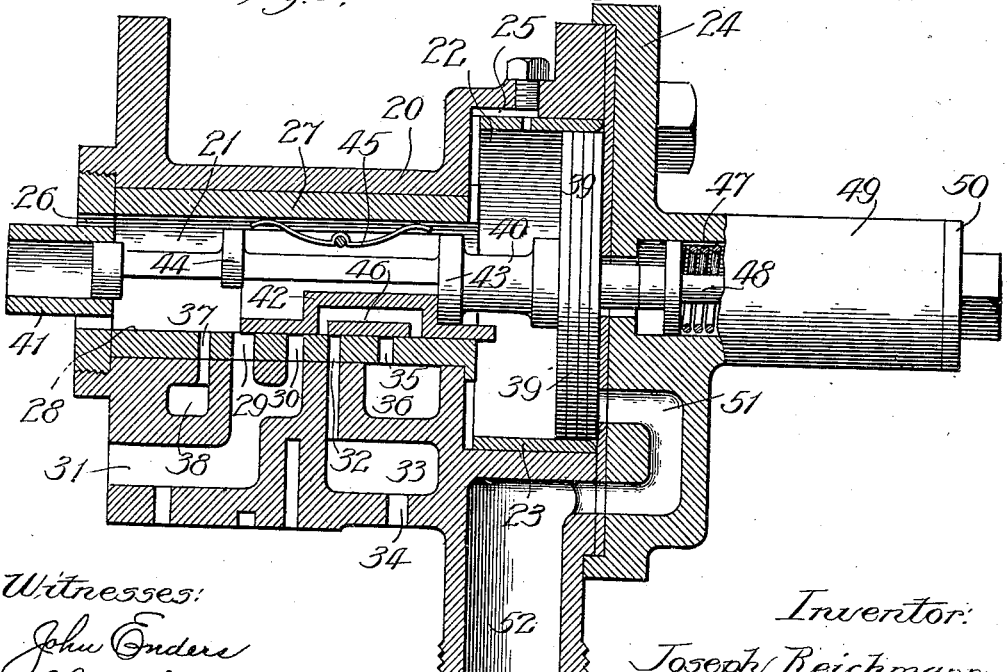

J. REICHMANN.
FLUID PRESSURE BRAKE APPARATUS.
APPLICATION FILED OCT. 9, 1909. RENEWED NOV. 19, 1910.

991,801.

Patented May 9, 1911.

8 SHEETS—SHEET 6.

Witnesses:
John Enders
Chas. H. Buell

Inventor:
Joseph Reichmann.
By Dyrenforth, Lee, Chritton & Wiles
Attys.

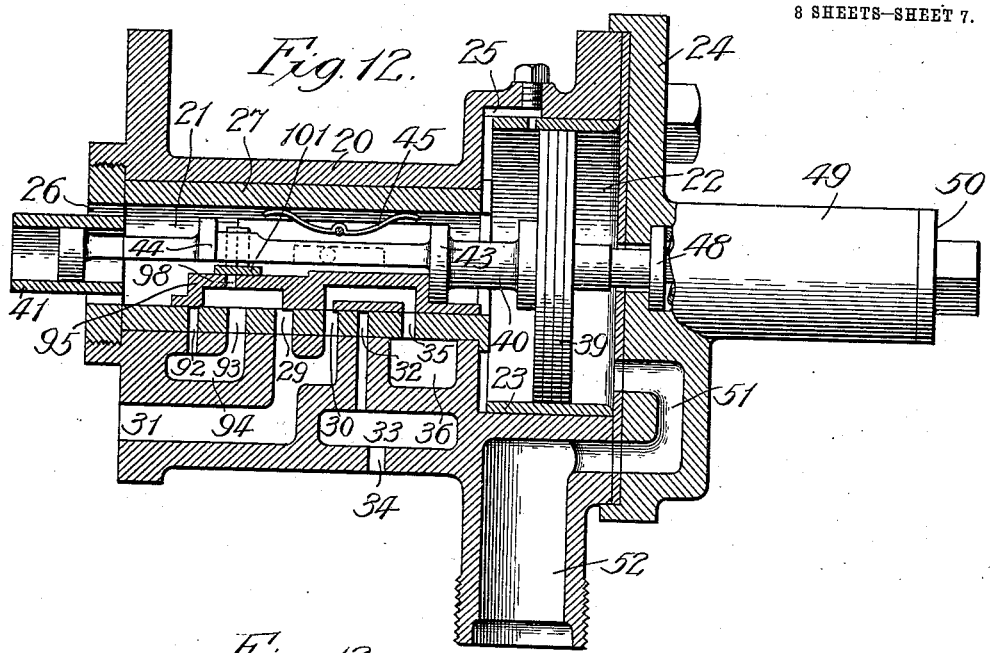
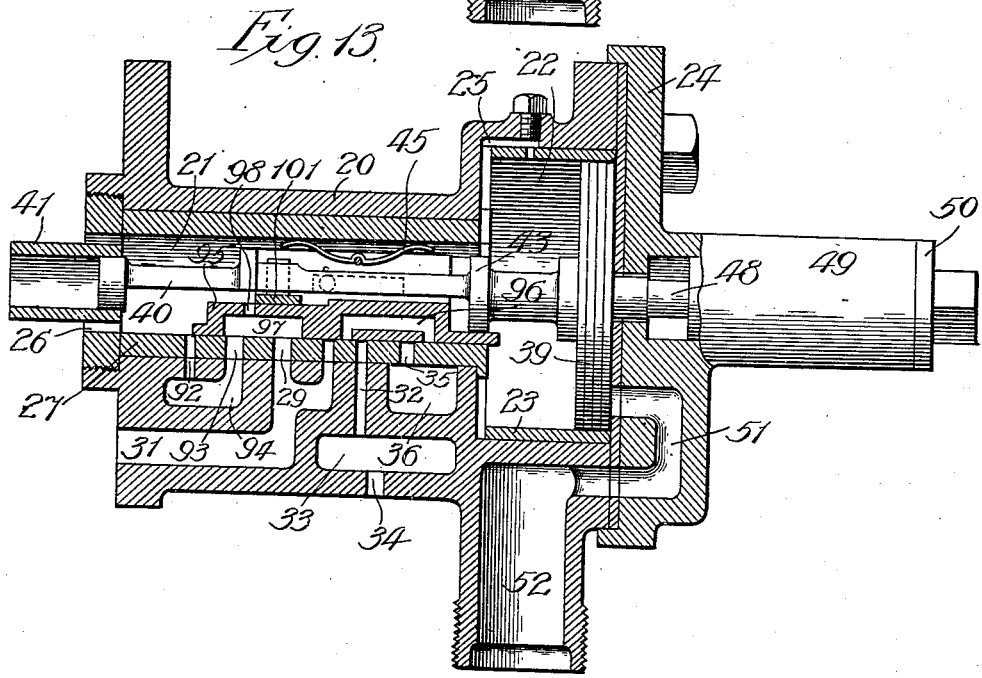

J. REICHMANN.
FLUID PRESSURE BRAKE APPARATUS.
APPLICATION FILED OCT. 9, 1909. RENEWED NOV. 19, 1910.

991,801.

Patented May 9, 1911.
8 SHEETS—SHEET 8.

Witnesses:
John Enders
Chas. H. Bull

Inventor:
Joseph Reichmann,
By Dyrenforth, Lee, Chritton & Wiles
Attys.

UNITED STATES PATENT OFFICE.

JOSEPH REICHMANN, OF CHICAGO, ILLINOIS.

FLUID-PRESSURE BRAKE APPARATUS.

991,801. Specification of Letters Patent. Patented May 9, 1911.

Application filed October 9, 1909, Serial No. 521,833. Renewed November 19, 1910. Serial No. 593,262.

*To all whom it may concern:*

Be it known that I, JOSEPH REICHMANN, a citizen of the United States, residing at Chicago, in the county of Cook and State of Illinois, have invented a new and useful Improvement in Fluid-Pressure Brake Apparatus, of which the following is a specification.

My primary object is to provide a novel construction of the triple-valve of a fluid-pressure brake apparatus, adapting it to be used as an automatic brake and as a non-automatic brake by the manipulation of the engineer's brake-valve, to charge the brake-cylinder with compressed air from the main reservoir through the train-pipe, or from the auxiliary-reservoir, to apply the brakes and to retain the triple-valve in a brake-setting position when charging the brake-cylinder with compressed air from the main reservoir through the train pipe, until it is required to release the brake.

It is also my object to operate the triple-valve, by the normal increase of the train-pipe air-pressure admitted through the engineer's brake-valve, to release the brakes instantly and positively.

Figure 6:
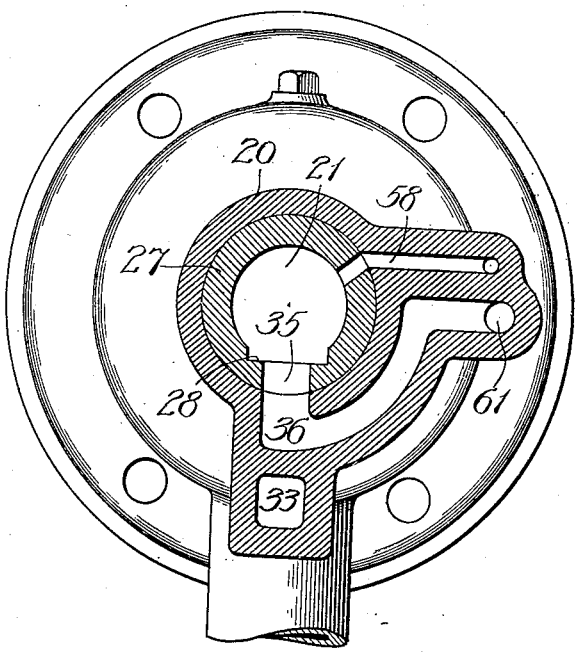
Figure 7:
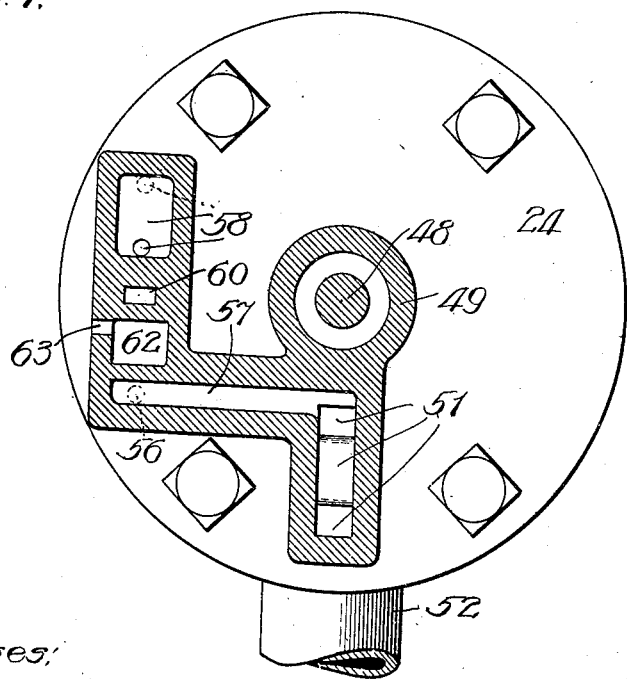
Figure 10:
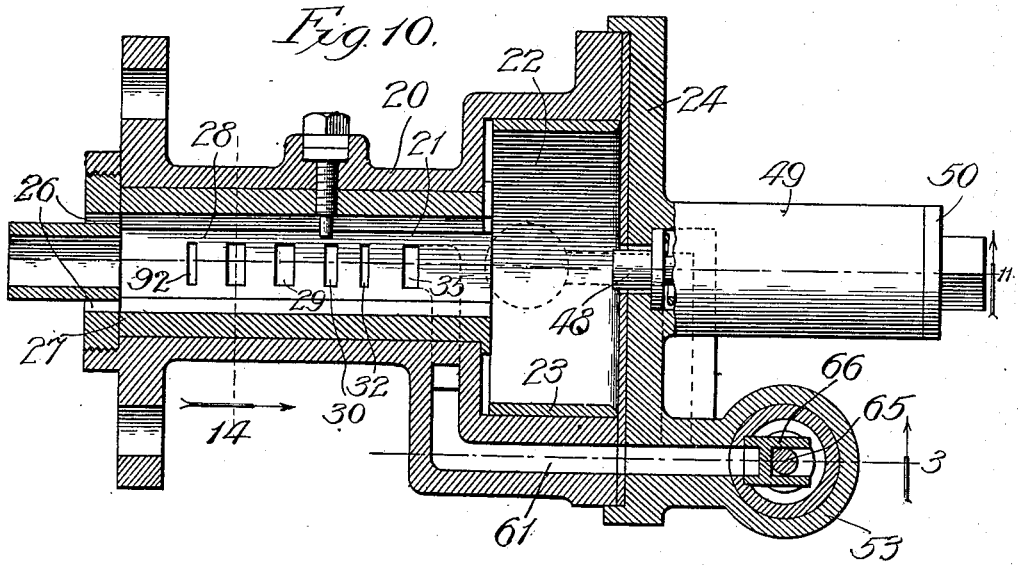
Figure 11:
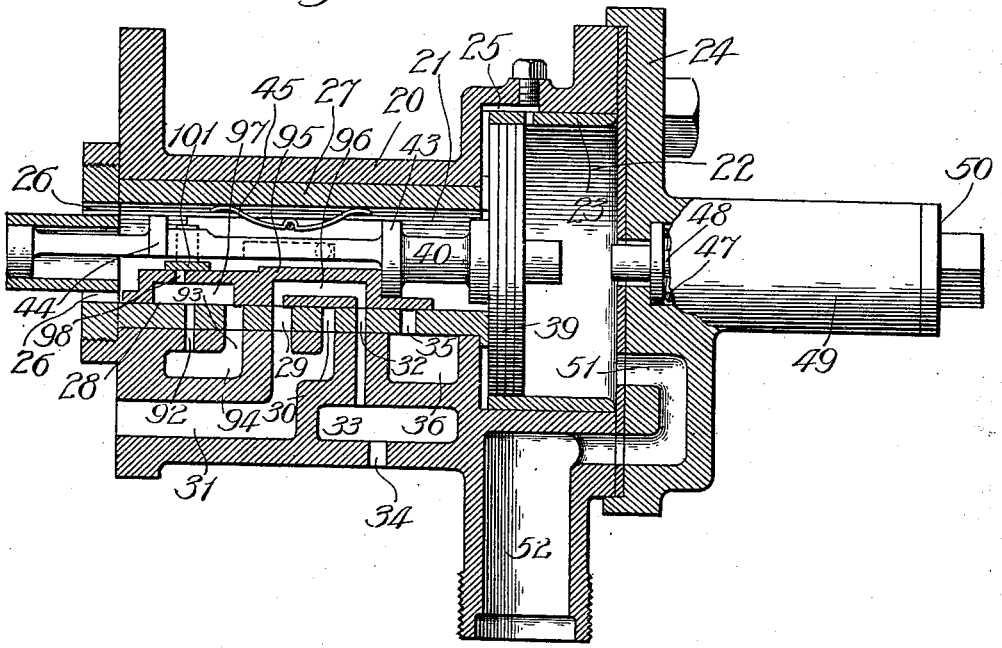
Figure 14:
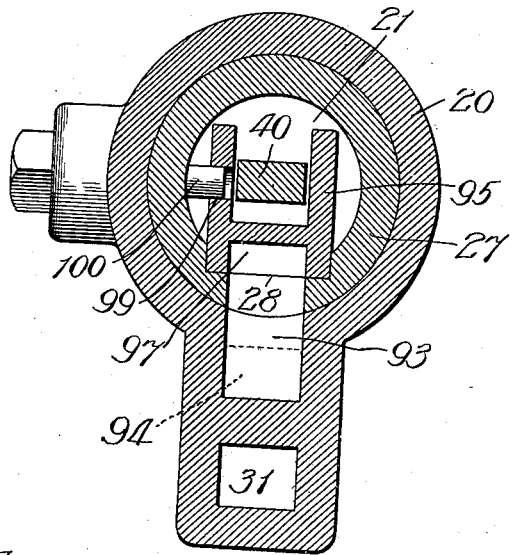

Referring to the accompanying drawings—Figure 1 is a vertical section through my improved valve device, taken on line 1 in Fig. 4; Fig. 2, an enlarged broken section taken on irregular line 2 in Fig. 1; Fig. 3, a section taken on line 3 in Figs. 4 and 10, illustrating the construction of a supplemental valve-device; Fig. 4, a plan section taken on irregular line 4 in Fig. 1; Fig. 5, a broken section on line 5 in Fig. 4; Fig. 6, a broken section on irregular line 6 in Fig. 4; Fig. 7, a broken section on line 7 in Fig. 4, corresponding with line 7 in Fig. 3; Fig. 8, a section through the main part of the triple-valve showing features illustrated in Fig. 1, but in service-application position; Fig. 9, a view the same as Fig. 8, but showing the moving parts in emergency-application position; Fig. 10, a view corresponding with Fig. 4, but illustrating a modification; Fig. 11, a view, partly in section, taken on line 11 in Fig. 10; Fig. 12, a view corresponding with Fig. 11, but showing the moving parts in another position; Fig. 13, a view like Figs. 11 and 12, but showing the moving parts in still another position; Fig. 14, an enlarged section on line 14 in Fig. 10; and Fig. 15, a section like Fig. 12, but illustrating a further modification.

The main shell, or body-portion, 20 of the triple-valve contains the slide-valve chamber 21; the piston-chamber 22, having a bushing 23 and closed by the cap 24; and the usual feed-port 25 and port 26 leading to the auxiliary reservoir. The slide-valve-chamber bushing 27 presents the flat slide-valve seat 28, which, in the preferred construction, presents ports 29 and 30 communicating with the brake-cylinder passage 31; a port 32 communicating through the exhaust-passage 33 with the exhaust-opening 34; a port 35 communicating with a passage 36; and a port 37 communicating with the passage 38. The main piston 39 controls the feed-port 25, and its stem 40 is guided at its opposite end in the guide-extension 41.

Fitting upon the seat 28 is the main slide-valve 42 confined between shoulders 43, 44 on the piston-stem and held to its seat by the spring 45 in the usual way. The slide-valve of the preferred construction is shaped as shown in Figs. 1, 8 and 9 with the cored passage 46 as illustrated. The cap 24 contains the graduating-spring 47 and stem 48 within a cylindrical extension 49 closed by the graduating-stem nut 50, and a cored passage 51 extending to the train-pipe passage 52.

On the cap 24 at one side of the cylindrical extension 49, as shown in Fig. 4, is a shell or supplemental-valve body 53 containing a piston-chamber 54 and a slide-valve chamber 55 in open communication with each other. Extending from the lower end of the chamber 55 is a port 56 communicating through a cored passage 57 (see Fig. 7) with the train-pipe passage 51. Extending from the top of the chamber 54 (see Figs. 3 and 6) is a passage 58 extending to the slide-valve chamber 21 above the slide-valve, and therefore practically in open communication with the auxiliary reservoir. In the chamber 55 is a valve-seat 59 containing a port 60 communicating through a passage 61 and the chamber or passage 36 with the port 35 in the slide-valve seat 28. Also in the slide-valve seat 59 is a port 62 communicating with an exhaust-opening 63. In the chamber 54, beneath the mouth of the passage 58, is a piston 64 on a stem 65 carrying a slide-valve 66 on the seat 59. Secured to and extending upward from the piston 64 is a stem 67. On the shell 53 is a cylindrical shell-extension 68 containing an adjustable sleeve or inner cylinder 69 having an inwardly-projecting annular shoulder 70 loosely surrounding the stem 67. The said stem at its upper end has an enlarged head 71, and confined between the said head and the shoulder 70 about the stem 67 is a spring 72. The sleeve or inner cylinder 69 has a threaded connection at 73 with the outer cylinder 68 and with a cap 74, being notched for the insertion of a screw-driver at its upper end, as indicated at 75. The spring 72 tends normally to hold the piston 64 in the position indicated in Fig. 3, opening communication between the ports 60, 62 and closing communication between the chamber 55 and port 60. The tension of the spring 72 may be adjusted by removing the cap 74, turning the sleeve 69 on the thread 73 and then replacing the cap 74.

It will be understood from the foregoing description that the under side of the piston 64 is in open communication at all times with the train-pipe and at its upper side is in open communication at all times with the auxiliary reservoir through the slide-valve chamber 21.

Depending from the valve-shell 20 is a shell or casing formed of two members 76 and 77 connected together. In the casing-member 76 is a slide-valve chamber 78 to the top of which extends the cored passage 38, the course of which is indicated by full and dotted lines in Fig. 1, and by full lines in Fig. 2. In the chamber 78 is a slide-valve seat 79 containing the port or passage 80 extending to the brake-cylinder passage 31. In the casing-member 77 is a piston-chamber 81 containing a piston 82 on a stem 83 extending upward through the chamber 78 and carrying a slide-valve 84 governing the port 80. In the cylindrical lower part of the casing-member 77 is an inner cylinder or sleeve 85 having a threaded portion 86 engaging threads in the lower end of the member 77 and engaging a cap 87. The lower end of the piston stem 83 abuts against a sliding socket-piece 88 having an opening 89 through it. Confined between the lower end of the inner casing 85 and the said socket-piece is a spring 90 which may be tensioned by turning the sleeve 85 at its thread 86 in the lower end of the casing-member 77. In the said member, in the position shown, is a port 91 to the atmosphere.

Figs. 1, 3, 4 and 5 show the normal positions of moving parts when the engineer's valve is at running position. The auxiliary reservoir is filled with pressure through the feed-passage 25, etc., to or approximately to the train-pipe pressure, and the same pressure is exerted against the upper and under sides of the piston 64 in the shell 53.

The operations of the preferred construction described may be stated as follows: To apply the brakes, air is discharged through the engineer's valve to reduce the pressure in the train-pipe, passage 52, chamber 22 and also in the chamber 55. During the initial stage of this reduction of the train-pipe pressure the lowering of the pressure in the chamber 55, beneath the piston 64, causes the latter to be moved by the superior auxiliary reservoir pressure above the piston in the chamber 54. It is to be understood that the piston 64 is more sensitive to movement than the piston 39, the spring 72 offering only sufficient resistance to effect return or raising of the piston 64 when pressures on opposite sides thereof are approximately balanced. The downward movement described of the piston 64 causes the slide-valve 66 to be lowered, closing the exhaust communication with the port 62 and opening the port 60 to the chamber 55. During this operation the piston 39, and attendant parts, remain stationary, but only momentarily because when the pressure in the train-pipe falls sufficiently below the auxiliary reservoir pressure the latter is exerted against the piston 39 to move it and the attendant parts to the position shown in Fig. 8. This causes the feed-port 25 to be first closed, after which the slide-valve 42 closes the exhaust-port 32 and opens the ports 35, 30 and 37. The instant that the port 35 is opened air-pressure from the chamber 55, beneath the piston 64, will pass through the port 60, passage 61, 36, port 35, port 30 and passage 31, to the brake-cylinder, thus admitting air directly from the train-pipe into the brake-cylinder. The instant the train-pipe air-pressure is reduced, to cause the movement of the triple-valve, as described, communication between the train-pipe and the atmosphere must be closed by the engineer, and slight air-pressure from the main reservoir may instantly be admitted into the train-pipe through the engineer's valve, which will pass through the passages 52, 57 and chamber 55, through the port 60 into the passage 61, 36, and through the port 35, valve-cavity 46, port 30 and passage 31 to the brake-cylinder. When the main slide-valve 42 is moved to the position shown in Fig. 8 the port 37 is opened, as before stated, thereby admitting normal auxiliary reservoir air-pressure through the passage 38 into the chamber 78 above the piston 82. Under this pressure against the said piston the spring 90 will yield to permit the movement of the piston 82, thereby shifting the valve 84 to open the port 80. This permits the air-pressure from the auxiliary reservoir to pass through the port 37, passage 38, chamber 78, port 80 and passage 31 into the brake-cylinder at the same time that the initial train pipe air, while being supplied, as aforesaid, from the main reservoir is passing to the brake-cylinder, as described. The spring 90 is so tensioned that it will yield under normal auxiliary reservoir pressure, but return when the said pressure is but slightly reduced. In the discharge of air-pressure from the auxiliary reservoir to the brake-cylinder, as described, the air-pressure in the chamber 78 above the piston 82 is reduced to a predetermined degree governed by the tension of the spring 90, when said spring will instantly raise the piston 82 with the valve 84 and prevent further escape of pressure from the auxiliary reservoir. In the more or less slight reduction of auxiliary reservoir air-pressure described, the air-pressure in the chamber 54 is also reduced, but not sufficiently to permit the spring 72 to raise the piston 64 and slide-valve 66. Thus, the port 60 remains open and the train-pipe air, while being supplied, as aforesaid, from the main reservoir, is free to pass into the brake-cylinder. While the port 60 is open the flow of pressure from the train-pipe to the brake-cylinder will continue until the two are balanced or approximately balanced. This applies the brake, in practice, with a comparatively gentle force, such as is required in ordinary service-stops. If more severe application of brakes is desired the engineer lets a little more main reservoir air into the train-pipe to raise the pressure in the brake-cylinder. This rise, however, should not be sufficient to actuate the main piston and main slide-valve against the opposition of the auxiliary reservoir pressure. Thus, from the start, the pressure of air in the brake-cylinder is controlled by the engineer through manipulations of the engineer's brake-valve. During this time it will be understood that the auxiliary reservoir air pressure is reduced only to a standard governed by the resistance of the spring 90. When the parts are in the position shown in Fig. 8 further movement of the piston 39 and attendant parts is limited by the resistance of the graduating-spring 47. The tension of the spring 47 may be adjusted to retain the piston 39 in the position shown in Fig. 8 until the air-pressure in the train-pipe is reduced to the lowest degree of pressure desirable for charging the brake-cylinder with straight air, while being supplied, as aforesaid, from the main reservoir from the train-pipe.

To release brakes the engineer's valve is manipulated to raise the train-pipe air-pressure to or approximately to that of the auxiliary reservoir pressure, which will cause the spring 72 to raise the piston 64 and valve 66 and cause the brake-cylinder air pressure to exhaust through the passage 61, the port 62 and exhaust-opening 63, the parts being in the position indicated in Fig. 3. The piston 39 with the valve 42 will remain stationary in the position shown in Fig. 8, while the air-pressure from the brake-cylinder exhausts, as described, to release the brakes. After the brakes are released, or as they are being released, in the manner described, the train-pipe pressure may be raised sufficiently to overcome the resistance of the auxiliary reservoir pressure against the main piston 39 and attendant parts to return them to the position shown in Fig. 1, and recharge the auxiliary reservoir.

Should it not be desired to employ the straight-air feature of my improved device, by extending the lap of the valve 66 upward to keep the port 60 covered in the downward movement of the piston 64, no air-pressure from the train-pipe will be charged into the brake-cylinder. The brake may be released by an increase of the train-pipe pressure, moving the piston 64 with the valve 66 to the position shown. In such case the valve device 53 would operate simply as a quick release valve.

For the purpose of an emergency-stop the engineer's valve is opened wide in the usual manner to produce the rapid discharge and consequent lowering of the train-pipe pressure. This causes the main piston 39 and attendant parts to move rapidly from the position shown in Fig. 1 past that shown in Fig. 8 to that shown in Fig. 9, compressing the graduating-spring 47 and opening the port 29 from the auxiliary reservoir to the brake-cylinder to charge the latter with approximately the full force of auxiliary reservoir pressure. Of course, during the initial emergency action, trainpipe pressure will flow to the brake-cylinder, due to the descent of the piston 64 and slide-valve 66.

In the modification shown in Figs. 10 to 14, inclusive, the slide-valve seat 28 is provided with the same ports and passages 29, 30, 32 and 35, but ports 92, 93 are provided, in communication with each other through a passage 94 in place of the port 37. The valve device, formed of the shell-members 76, 77 and attendant parts, is dispensed with, as well as the passages 38 and 80. The valve device 53 and attendant parts, constructed as shown in Fig. 3 and before described, is in communication with the main, or triple, valve-device through ports and passages the same as in the preferred construction. The slide-valve 95, employed in place of the slide-valve 42, has a passage 96 and a cavity 97, in the relative positions shown, to coöperate with the ports in the valve-seat 28; and extending through the top of the cavity is a port 98. The slide-valve 95 is somewhat shorter than the distance between the stops 43, 44 on the piston-stem 40 and has a groove 99 in its side (see Fig. 14) of predetermined length engaged by a stationary stop-pin 100. Fixed to the piston-stem 40 and movable therewith to open and close the port 98 is an auxiliary valve 101 sliding upon the upper face of the slide-valve 95. In this construction the graduating-spring 47 is so tensioned that it will yield slightly under the force of impact therewith of the stem 40 when the first service reduction is made in the train-pipe. In operation, when a first reduction is produced through the engineer's valve in the train-pipe, the supplemental valve mechanism shown in Fig. 3 operates as before described and the piston 39 is moved from the position shown in Fig. 11. In the first movement the auxiliary slide-valve 101 uncovers the port 98 causing auxiliary-reservoir pressure to pass into the cavity 97, and in the further movement of the piston the main slide-valve 95 is drawn to open the cavity 97 to the port 29, whereby a gust of auxiliary-reservoir pressure will travel to the brake-cylinder. The main piston, on reaching the limit of its traverse toward the right, compresses the graduating-spring 47 slightly, whereby, in the recoil of said spring, and owing partly to the slight reduction of auxiliary-reservoir pressure which has been effected, the piston is returned to the position shown in Fig. 12 without affecting the position of the main slide-valve, but causing the auxiliary slide-valve 101 to again close the port 98 and prevent further escape of auxiliary-reservoir pressure to the brake-cylinder. The auxiliary slide-valve 101 takes the place of the mechanism shown in the casing members 76, 77 in Fig. 1, and performs the functions of that mechanism. Otherwise the operations of the triple and supplemental valves are in all respects as described in connection with the preferred construction. When the train-pipe pressure is lowered for emergency application of brakes the main piston and attendant parts are moved against the resistance of the graduating-spring 47 to the position shown in Fig. 13, whereby the auxiliary reservoir is opened to the brake-cylinder, not only through the port 98, but also through the port 92, passage 94 and port 93, as plainly shown.

Figure 15:
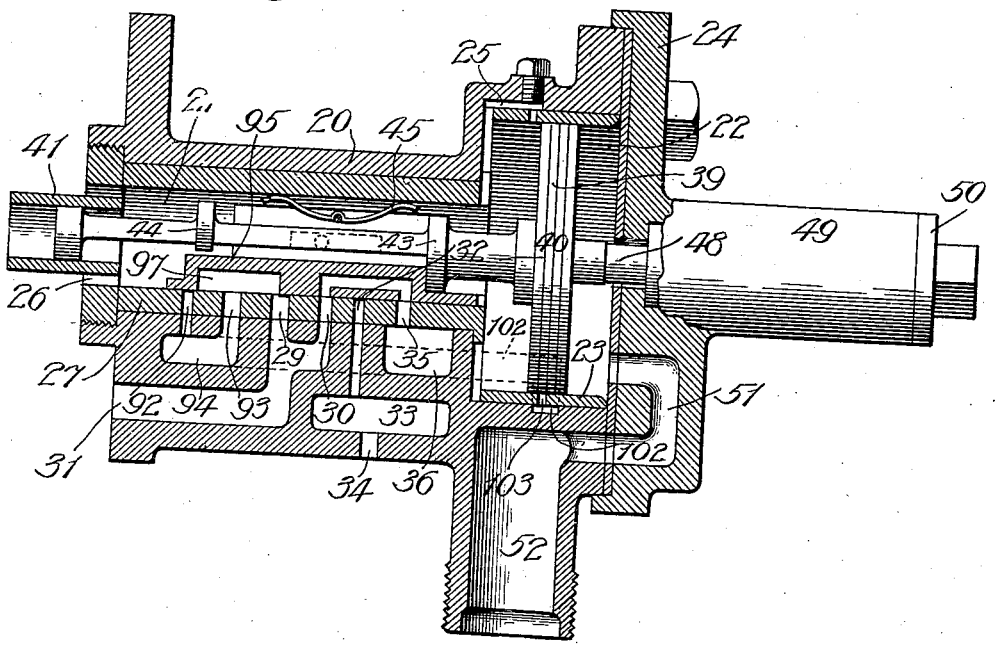

In the modification illustrated in Fig. 15, the passage 94 communicates through a cored passabe 102, illustrated by dotted lines, with a port 103 in the bushing 23, and with the cavity 97 in the main slide-valve 95. There is the same independent movement of the main piston 39, with reference to the main slide-valve 95, as in the other modification, the piston 39 taking the place of the auxiliary slide-valve 101. When the piston 39, under a wave of reduction in the train-pipe, compresses slightly the graduating-stem 48 it opens the port 103 permitting auxiliary-reservoir pressure to pass momentarily through the passages 102, 94, ports 93, 29 and passage 31 to the brake-cylinder. The supplemental valve-device 53 operates, as before described, to direct train-pipe pressure to the brake-cylinder in each application.

In what I have hitherto described as the preferred construction, employing the valve device 76, 77 illustrated in Fig. 1, the spring 90 definitely controls the passage of pressure from the auxiliary reservoir to the brake-cylinder and permits such passage only during a first service application, while, at the same time, offering no obstruction to its passage in emergency applications. Although the preferred construction is somewhat more expensive to manufacture than the modified constructions, the fact that by its use a predetermined standard high auxiliary-reservoir pressure is always maintained to retain the triple-valve in the brake-setting position, when charging the brake-cylinder with air, while being supplied, as aforesaid, from the main-reservoir pressure from the train-pipe, and for a quick emergency application, when necessary, renders it particularly desirable.

The object of the port 62 in the supplemental valve device 53, is to effect quick-release of brakes, and obviate all danger of their sticking. If desired, however, the supplemental valve device may be provided without the feature of an exhaust port 62, opened simultaneously with the closing of the port 60, in which event the engineer's valve may readily be manipulated to cause such fluctuations of pressure in the train-pipe as will allow for a plurality of intermittent ventings of train-pipe air while being supplied, as aforesaid, from the main-reservoir, into the brake-cylinder, for successively increasing straight-air applications, without disturbing the brake-setting position of the triple-valve. This and other modifications in details of construction may be made without departing from the spirit of my invention as defined by the claims.

I am aware that it is old in the art to provide means, in connection with the triple-valve of an automatic air-brake system, for admitting pressure from the train-pipe, as well as from the auxiliary-reservoir, to the brake-cylinder to properly regulate the service applications of brakes when, but only when, owing to defective adjustment or wear of parts, the travel of the brake-cylinder piston is unduly increased. By this construction, when conditions are normal, service applications are effected by auxiliary-reservoir pressure alone. On the other hand, it is essentially characteristic of my improved construction that for service applications only a limited amount of pressure is vented from the auxiliary-reservoir under any circumstances, (to at all times reserve sufficient auxiliary pressure for emergency action) and train-pipe pressure, while being supplied from the main-reservoir, necessarily passes to the brake-cylinder, under any conditions of capacity of the latter.

What I claim as new and desire to secure by Letters Patent, is—

1. In the triple-valve of a fluid-pressure brake-apparatus, the combination of ports through which air from the train-pipe and from the auxiliary-reservoir passes to the brake-cylinder and from the brake-cylinder to the atmosphere, to exhaust the air from the brake-cylinder, a valve controlling said ports, and a piston for actuating said valve to admit air from the train-pipe, while being supplied from the main reservoir, to the brake-cylinder under all conditions of capacity of the brake-cylinder by a preliminary traverse to emergency position and which, by a further traverse, admits air from the auxiliary-reservoir only to the brake-cylinder, for the purpose set forth.

2. In the triple-valve of a fluid-pressure brake-apparatus, the combination of a piston actuated in one direction by auxiliary-reservoir pressure and in the opposite direction by train-pipe pressure, and a valve operatively connected with the piston controlling the passage of air from the train-pipe and from the auxiliary-reservoir to the brake-cylinder and from the brake-cylinder through an independent passage leading directly to the atmosphere, and to charge the brake-cylinder under all conditions of capacity of the brake-cylinder with air from the train-pipe, while being supplied from the main reservoir, by the preliminary traverse of said piston to emergency position, a further traverse of the piston operating to admit air from the auxiliary-reservoir only to the brake-cylinder.

3. In the triple-valve of a fluid-pressure brake-apparatus, the combination of a valve-chamber having ports through which air passes to the brake-cylinder from the train-pipe and from the auxiliary-reservoir, respectively, and from the brake-cylinder to the atmosphere, to exhaust the air from the brake-cylinder, a slide-valve controlling said ports, and a piston movable by variation in the train-pipe pressure to actuate the slide-valve to charge the brake-cylinder under all conditions of capacity of the brake-cylinder with air from the train-pipe, while being applied from the main-reservoir, by the preliminary traverse of the slide-valve and which, by causing further traverse of the slide valve, to emergency position admits air from the auxiliary-reservoir only to the brake-cylinder.

4. In the triple-valve of a fluid-pressure brake-apparatus, the combination of a main valve-chamber, having ports through which air passes to the brake-cylinder from the train-pipe and from the auxiliary-reservoir, and from the brake-cylinder to the atmosphere, to exhaust the air from the brake-cylinder, a supplemental-valve device communicating with the train-pipe and having a port communicating with said main valve-chamber, a slide-valve in the main valve-chamber governing the ports therein, a piston actuating said valve to charge the brake-cylinder with air from the train-pipe, while being supplied from the main-reservoir by a preliminary traverse, and which, by a further traverse, admits air from the auxiliary-reservoir to the brake-cylinder, and a piston and slide-valve in the supplemental-valve device subject at opposite sides to pressure from the auxiliary-reservoir and train-pipe and actuated by the lowering of train-pipe pressure to open a port in the supplemental-valve and vent pressure from the train-pipe to the brake-cylinder.

5. In the triple-valve of a fluid-pressure brake-apparatus, the combination of a valve and piston whose preliminary traverse admit air from the train-pipe to the brake-cylinder, and which, by a further traverse, admit air from the auxiliary-reservoir to the brake-cylinder, and a yielding abutment for the piston operating to retain the valve in the position of admitting air from the train-pipe while being supplied from the main-reservoir to the brake-cylinder direct, as and for the purpose set forth.

6. In a triple-valve device for fluid-pressure brake-apparatus, a supplemental-valve chamber having a piston exposed at opposite sides to train-pipe and auxiliary-reservoir pressures, a port in said chamber and a slide-valve connected with said piston and governing said port, a main-valve chamber having a port communicating with the port in the supplemental chamber and having ports and passages communicating with the brake-cylinder and outside air, a slide-valve governing said ports in the main chamber, a piston in the main chamber for actuating the slide-valve therein, the piston being exposed on opposite sides to train-pipe and auxiliary-reservoir pressures, all so constructed and arranged that when pressure is reduced in the train-pipe the valve in the supplemental chamber opens the port therein and the main-valve is then actuated to vent auxiliary-reservoir pressure into the brake-cylinder and open communication between the port of the supplemental-valve and brake-cylinder for the direct passage of air from the train-pipe to the brake-cylinder, for the purpose set forth.

7. In a triple-valve device for fluid-pressure brake-apparatus, a supplemental-valve chamber having a piston exposed at opposite sides to train-pipe and auxiliary-reservoir pressures, a port in said chamber and a slide-valve connected with said piston and governing said port, a main-valve chamber having a port communicating with the port in the supplemental chamber and having ports and passages communicating with the brake-cylinder and outside air, a slide-valve governing said ports in the main chamber, a piston in the main chamber for actuating the slide-valve therein, the piston being exposed on opposite sides to train-pipe and auxiliary-reservoir pressures, all so constructed and arranged that when pressure is reduced in the train-pipe the valve in the supplemental chamber opens the port therein and the main-valve is then actuated to vent auxiliary-reservoir pressure into the brake-cylinder and open communication between the port of the supplemental-valve chamber and brake-cylinder for the direct passage of air from the train-pipe to the brake-cylinder, and means for limiting the escape of pressure from the auxiliary-reservoir to the brake-cylinder, for the purpose set forth.

8. In a triple-valve device for fluid-pressure brake-apparatus, the combination of a main-valve chamber having ports through which air from the train-pipe and from the auxiliary-reservoir passes to the brake-cylinder, and from the brake-cylinder to the atmosphere, to exhaust the air from the brake-cylinder, a valve controlling said ports and a piston for actuating said valve, and a supplemental-valve device having a passage communicating with the train-pipe and a port communicating through the main-valve chamber with the brake-cylinder, a piston in the supplemental chamber exposed on opposite sides to auxiliary-reservoir and train-pipe pressures, a slide-valve connected with said piston in the supplemental-valve device controlling the port therein, all so constructed and arranged that when the main-valve device is in the brake-setting position air may pass directly from the train-pipe through the supplemental and main-valve chambers to the brake-cylinder by the movement of the piston in the supplemental-valve device, for the purpose set forth.

9. In the triple-valve of a fluid-pressure brake-apparatus, the combination of a piston actuated in one direction by auxiliary-reservoir pressure and in the opposite direction by train-pipe pressure, a valve connected with said piston and having a cavity controlling, by the movement of the valve and piston, a port admitting air from the train-pipe while being supplied from the main reservoir to the brake-cylinder, and a port for exhausting the air from the brake-cylinder to the atmosphere, substantially as described.

10. In the triple-valve of a fluid-pressure brake-apparatus, having connections leading to a train-pipe, an auxiliary-reservoir and a brake-cylinder, respectively, the combination of a main-slide valve and piston and a supplemental-slide valve and piston, each actuated in one direction by auxiliary-reservoir pressure and in the opposite direction by train-pipe pressure to jointly control communication between the train-pipe while being supplied from the main-reservoir and the brake-cylinder, substantially as described.

11. In the triple-valve of a fluid-pressure brake-apparatus, having connections leading to a train-pipe, an auxiliary-reservoir and a brake-cylinder, respectively, the combination of a main slide-valve and piston and a supplemental slide-valve and piston, each actuated in one direction by auxiliary-reservoir pressure and in the opposite direction by train-pipe pressure to jointly control communication between the train-pipe while being supplied from the main-reservoir and the brake-cylinder and between the brake-cylinder and the atmosphere, to exhaust the air from the brake-cylinder, substantially as described.

12. In the triple-valve of a fluid-pressure brake-apparatus, having connections leading to a train-pipe, an auxiliary-reservoir and a brake-cylinder, respectively, the combination of a main slide-valve and piston and a supplemental slide-valve and piston which in the service-application position of the main slide-valve jointly control ports for the exhaust of air from the brake-cylinder, substantially as described.

13. In a triple-valve device for fluid-pressure brake apparatus, the combination of a main valve chamber, having separate ports and passages through which air passes to the brake-cylinder from the auxiliary-reservoir and train-pipe while being supplied from the main-reservoir for service-applications of brakes, a main valve controlling said ports, a main piston for actuating said valve exposed on opposite sides to pressure from the train-pipe and auxiliary reservoir, respectively, and means, interposed in the passage for auxiliary reservoir air to the brake-cylinder, positively controlling the degree to which auxiliary reservoir pressure may fall by escape to the brake-cylinder in service-applications, for the purpose set forth.

14. In a triple-valve device for fluid-pressure brake apparatus, the combination of a main valve chamber, having separate ports and passages through which air passes to the brake-cylinder from the auxiliary-reservoir and train-pipe while being supplied from the main reservoir for service-applications of brakes, a main valve controlling said ports, a main piston for actuating said valve, exposed on opposite sides to pressure from the train-pipe and auxiliary reservoir, respectively, and means for positively controlling the degree to which auxiliary-reservoir pressure may fall by escape to the brake-cylinder in service-applications, comprising a chamber interposed in the passage for auxiliary-reservoir air to the brake-cylinder, a valve in said chamber governing the passage, a piston operatively connected with the valve in said chamber, and a return-spring for the piston tending normally to hold it in the position of closing said valve, the piston being exposed to pressure from the auxiliary-reservoir to move and open the valve while the pressure directed against it exceeds the resistance of its spring, all constructed and arranged to operate substantially as and for the purpose set forth.

15. In a triple-valve device for fluid-pressure brake apparatus, the combination of a main valve chamber, having separate ports and passages through which air passes to the brake-cylinder from the auxiliary-reservoir and train-pipe while being supplied from the main-reservoir for service-applications of brakes, a main valve controlling said ports, a main piston for actuating said valve, exposed on opposite sides to pressure from the train-pipe and auxiliary-reservoir, respectively, and means for positively controlling the degree to which auxiliary-reservoir pressure may fall by escape to the brake-cylinder in service-applications, comprising a chamber interposed in the passage for auxiliary-reservoir air to the brake-cylinder, a valve in said chamber governing the passage, a piston operatively connected with the valve in said chamber, a return-spring for the piston tending normally to hold it in the position of closing said valve, the piston being exposed to pressure from the auxiliary-reservoir to move and open the valve while the pressure directed against it exceeds the resistance of its spring, and means for regulating the tension of said spring, all constructed and arranged to operate substantially as and for the purpose set forth.

JOSEPH REICHMANN.

In presence of—
JOHN WILSON,
R. A. SCHAEFER.

---

Copies of this patent may be obtained for five cents each, by addressing the "Commissioner of Patents, Washington, D. C."

Corrections in Letters Patent No. 991,801

It is hereby certified that in Letters Patent No. 991,801, granted May 9, 1911, upon the application of Joseph Reichmann, of Chicago, Illinois, for an improvement in "Fluid-Pressure Brake Apparatus," errors appear in the printed specification requiring correction as follows: Page 5, line 18, the words "to emergency position" should be stricken out and inserted after the word "traverse", same page, line 19; same page, line 37, the words "to emergency position" should be stricken out and inserted after the word "piston", same page, line 38; and that the said Letters Patent should be read with these corrections therein that the same may conform to the record of the case in the Patent Office.

Signed and sealed this 6th day of June, A. D., 1911.

[SEAL.]
C. C. BILLINGS,
*Acting Commissioner of Patents.*